(12) United States Patent
Lymberopoulos et al.

(10) Patent No.: US 11,802,628 B2
(45) Date of Patent: Oct. 31, 2023

(54) ACTUATOR ASSEMBLIES AND RELATED METHODS FOR VALVE SYSTEMS

(71) Applicant: SAFOCO, INC., Houston, TX (US)

(72) Inventors: David Lymberopoulos, Houston, TX (US); Andrew Allen Kadavy, Houston, TX (US); James Eric Amberg, Cleveland, TX (US)

(73) Assignee: SAFOCO, INC.

( * ) Notice: Subject to any disclaimer, the term of this patent is extended or adjusted under 35 U.S.C. 154(b) by 87 days.

(21) Appl. No.: 17/592,085

(22) Filed: Feb. 3, 2022

(65) Prior Publication Data
US 2023/0243438 A1  Aug. 3, 2023

(51) Int. Cl.
  *F16K 31/122*  (2006.01)
  *F16K 27/02*  (2006.01)
  *F16K 1/52*  (2006.01)

(52) U.S. Cl.
  CPC ............ *F16K 31/1225* (2013.01); *F16K 1/52* (2013.01); *F16K 27/0254* (2013.01)

(58) Field of Classification Search
  CPC ..... F16K 31/1225; F16K 27/0254; F16K 1/52
  See application file for complete search history.

(56) References Cited

U.S. PATENT DOCUMENTS

| | | | |
|---|---|---|---|
| 3,469,503 A * | 9/1969 | Halderman, Jr. | F15B 11/123 92/65 |
| 4,096,881 A * | 6/1978 | Schabert | G21D 3/06 376/277 |
| 4,561,464 A * | 12/1985 | Frantz | F16K 11/10 137/627.5 |
| 5,007,328 A * | 4/1991 | Otteman | F16K 31/1221 251/63.5 |
| 6,814,338 B2 * | 11/2004 | Kajitani | F16K 51/02 251/285 |
| 9,103,465 B2 | 8/2015 | Lymberopoulos | |
| 9,163,619 B2 | 10/2015 | Lymberopoulos | |
| 9,441,453 B2 | 9/2016 | Lymberopoulos et al. | |
| 9,671,794 B1 | 6/2017 | Lymberopoulos et al. | |
| 9,890,609 B2 | 2/2018 | Lymberopoulos et al. | |
| 9,903,502 B2 * | 2/2018 | Fuhr | F15B 15/1409 |

(Continued)

FOREIGN PATENT DOCUMENTS

CN  111637231 A * 9/2020

*Primary Examiner* — Umashankar Venkatesan
(74) *Attorney, Agent, or Firm* — PATTERSON + SHERIDAN, L.L.P.

(57) ABSTRACT

Aspects of the present disclosure relate to actuator assemblies and related methods for valve systems. In one implementation, an actuator assembly for valves includes an outer housing. The outer housing includes a first internal volume and an inner shoulder portion. The actuator assembly includes an inner housing disposed at least partially in the outer housing. The inner housing includes a second internal volume. The actuator assembly includes one or more first pistons disposed in the first internal volume of the outer housing, and one or more second pistons disposed in the second internal volume of the inner housing. The one or more first pistons are disposed between the one or more second pistons and the inner shoulder portion of the outer housing. The actuator assembly includes an actuator stem disposed through at least a portion of the outer housing and coupled to the one or more second pistons.

20 Claims, 7 Drawing Sheets

(56) References Cited

U.S. PATENT DOCUMENTS

| | | |
|---|---|---|
| 11,384,876 B2 | 7/2022 | Kadavy |
| 11,506,006 B2 | 11/2022 | Lymberopoulos et al. |
| 11,519,536 B2 | 12/2022 | Lymberopoulos et al. |
| 11,530,601 B2 | 12/2022 | Lymberopoulos et al. |

* cited by examiner

ACTUATOR ASSEMBLIES AND RELATED METHODS FOR VALVE SYSTEMS

BACKGROUND

Field

Aspects of the present disclosure relate to actuator assemblies and related methods for valve systems.

Description of the Related Art

Valve systems often include metering or choke valves that are actuated by an actuator assembly. However, these valves can be limited in operation. As an example, most metering or choke valves have a limited range of operational flow rates at which fluids can flow through the valves. This is due to the actuator assembly not being capable of opening the metering or choke valve across a wide range of open positions.

Therefore, there is a need in the art new and improved valve systems.

SUMMARY

Aspects of the present disclosure relate to actuator assemblies and related methods for valve systems. In one aspect, a second piston is movable to stop against a first piston, and the first piston is movable to stop against a housing.

In one implementation, an actuator assembly for valves includes an outer housing. The outer housing includes an inner shoulder portion, one or more first fluid openings formed in the inner shoulder portion, and an outer protruding portion extending relative to a first side of the inner shoulder portion. The outer housing includes a sleeve portion extending relative to a second side of the inner shoulder portion. The sleeve portion includes a first inner surface at least partially defining a first internal volume. The outer housing includes one or more second fluid openings formed in the sleeve portion. The actuator assembly includes an inner housing disposed at least partially in the outer housing. The inner housing includes a second inner surface at least partially defining a second internal volume. The actuator assembly includes one or more first pistons disposed in the first internal volume and movable along the first inner surface of the outer housing, and one or more second pistons disposed in the second internal volume and movable along the second inner surface of the inner housing. The one or more first pistons are disposed between the one or more second pistons and the inner shoulder portion of the outer housing. The actuator assembly includes an actuator stem disposed through the outer protruding portion and through the inner shoulder portion of the outer housing, a cap ring coupled to the inner housing, and a valve stem disposed through the cap ring and coupled to the one or more second pistons.

In one implementation, an actuator assembly for valves includes an outer housing. The outer housing includes a first inner surface at least partially defining a first internal volume, and an inner shoulder portion. The actuator assembly includes an inner housing disposed at least partially in the outer housing. The inner housing includes a second inner surface at least partially defining a second internal volume. The actuator assembly includes one or more first pistons disposed in the first internal volume and movable along the first inner surface of the outer housing, and one or more second pistons disposed in the second internal volume and movable along the second inner surface of the inner housing. The one or more first pistons are disposed between the one or more second pistons and the inner shoulder portion of the outer housing. The actuator assembly includes an actuator stem disposed through at least a portion of the outer housing and coupled to the one or more second pistons.

In one implementation, a method of actuating a valve includes releasing a first pressurized fluid from a first chamber volume between a first piston disposed in an outer housing and a second piston disposed in an inner housing that is disposed at least partially in the outer housing. The releasing of the first pressurized fluid includes moving the second piston to stop the second piston against the first piston. The moving of the second piston includes moving a valve stem coupled to the second piston to a first open position. The first open position corresponds to a first flow rate. The method includes releasing a second pressurized fluid from a second chamber volume between the first piston and the outer housing. The releasing of the second pressurized fluid includes moving the first piston and the second piston to stop the first piston against the outer housing. The moving of the first piston and the second piston includes moving the valve stem coupled to the second piston to a second open position. The second open position corresponds to a second flow rate that is larger than the first flow rate.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one implementation may be beneficially utilized on other implementations without specific recitation.

DETAILED DESCRIPTION

Aspects of the present disclosure relate to actuator assemblies and related methods for valve systems. In one implementation, an actuator assembly for valves includes an outer housing. The outer housing includes a first internal volume, and an inner shoulder portion. The actuator assembly includes an inner housing disposed at least partially in the outer housing. The inner housing includes a second internal volume. The actuator assembly includes one or more first pistons disposed in the first internal volume of the outer housing, and one or more second pistons disposed in the second internal volume of the inner housing. The one or more first pistons are disposed between the one or more second pistons and the inner shoulder portion of the outer housing. The actuator assembly includes an actuator stem disposed through at least a portion of the outer housing and coupled to the one or more second pistons.

The disclosure contemplates that terms such as "couples," "coupling," "couple," and "coupled" may include but are not limited to welding, interference fitting, and/or fastening such as by using bolts, threaded connections, pins, and/or screws. The disclosure contemplates that terms such as "couples," "coupling," "couple," and "coupled" may include but are not limited to integrally forming. The disclosure contemplates that terms such as "couples," "coupling," "couple," and "coupled" may include but are not limited to direct coupling and/or indirect coupling, such as indirect coupling through components such as links.

Figure 1:
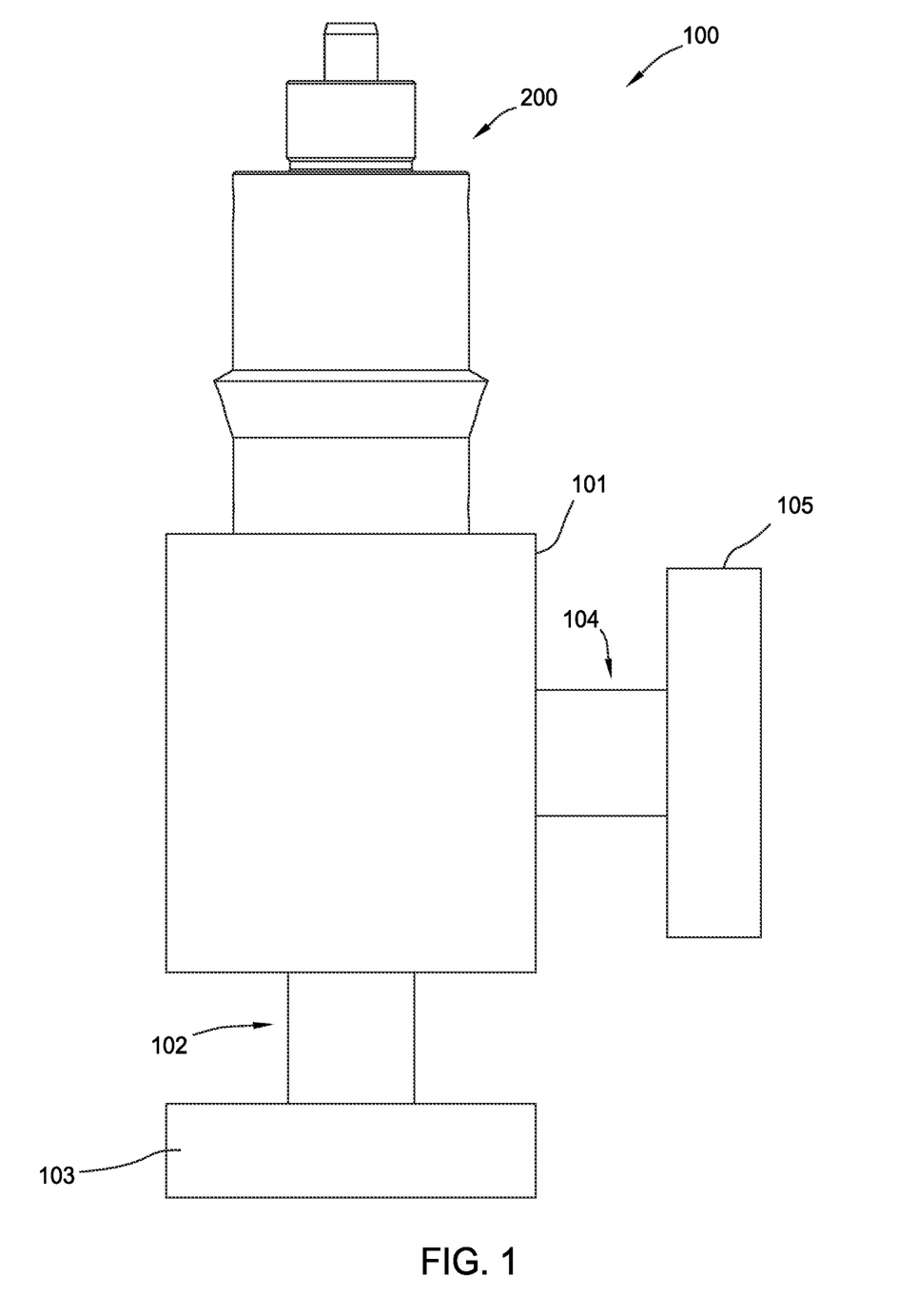
FIG. 1 is a schematic side view of a valve system, according to one implementation.

FIG. 1 is a schematic side view of a valve system 100, according to one implementation. The valve system 100 includes a valve 101 and an actuator assembly 200 coupled to the valve 101. The actuator assembly 200 is configured to open and close the valve 101 to allow or restrict fluid flow through the valve 101. Fluid may flow into the valve 101 via an inlet line 102 and may flow out of the valve 101 via an outlet line 104. The inlet line 102 includes a first flange 103 and the outlet line 104 includes a second flange 105 for coupling the lines 102, 104 to other fluid conduits and/or or equipment.

Figure 2:
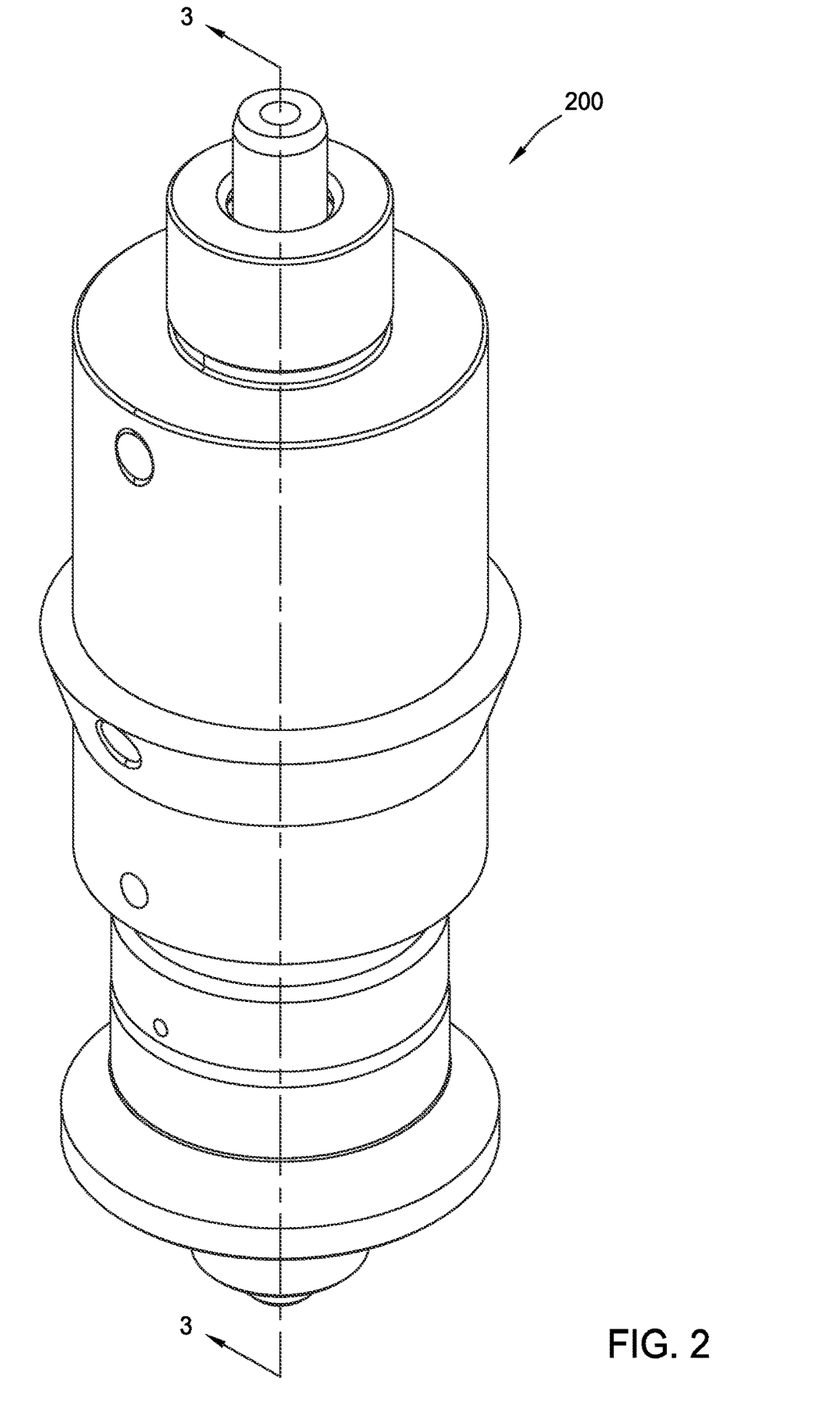
FIG. 2 is a schematic isometric view of an actuator assembly of the valve system shown in FIG. 1, according to one implementation.
Figure 3:
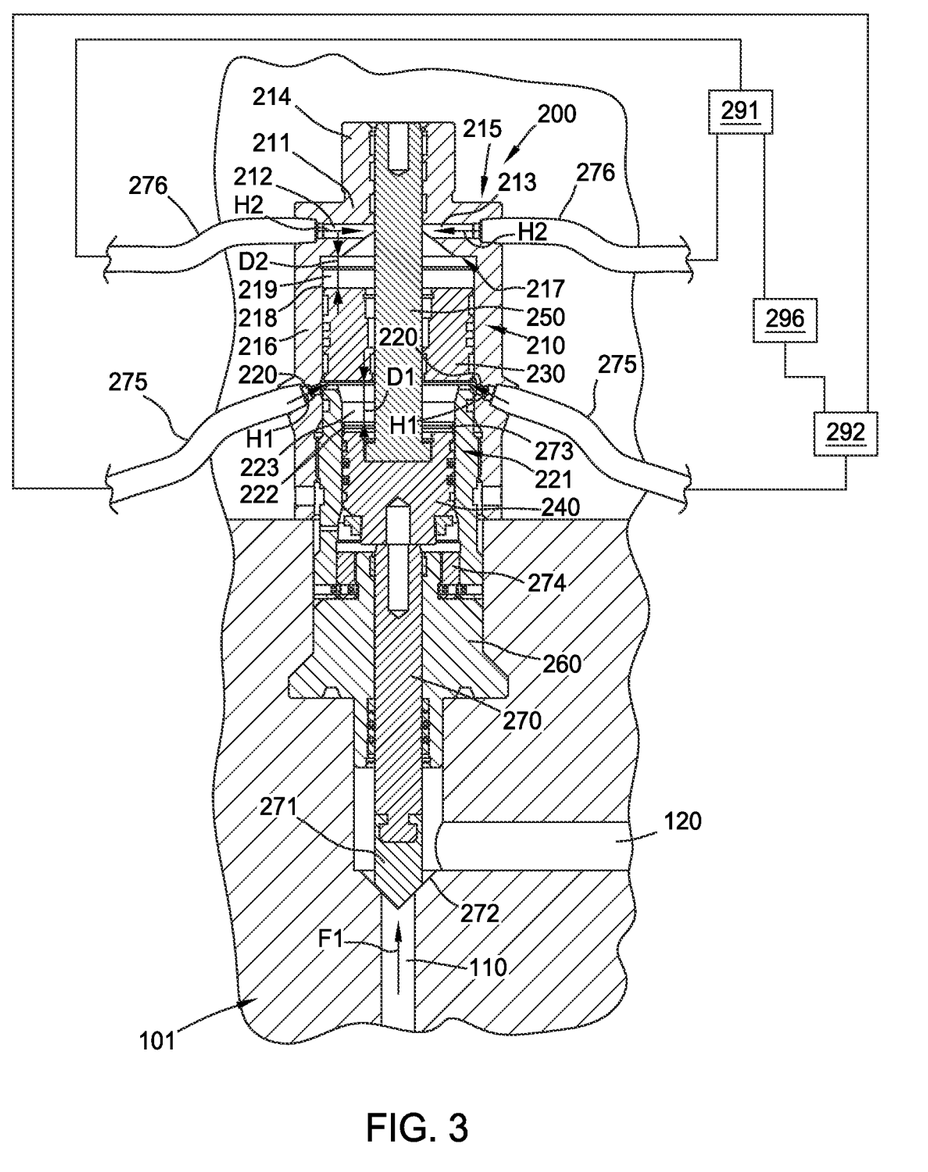
FIG. 3 is schematic partial cross-sectional view, along Section 3-3 shown in FIG. 2, of the valve system in a closed position, according to one implementation.

FIG. 2 is a schematic isometric view of the actuator assembly 200 shown in FIG. 1, according to one implementation. FIG. 3 is schematic partial cross-sectional view, along Section 3-3 shown in FIG. 2, of the valve system 100 shown in FIG. 1, according to one implementation. The actuator assembly 200 is in a closed position in FIG. 3 such that a fluid F1 in an inlet passage 110 of the valve 101 does not flow to an outlet passage 120 of the valve 101. The valve 101 is shown as a metering valve, and the actuator assembly 200 is shown as a metering actuator assembly. However, any type of valve may be used with the embodiments of the actuator assembly 200 described herein.

The actuator assembly 200 includes an outer housing 210. The outer housing 210 includes an inner shoulder portion 211 and one or more first fluid openings 212, 213 formed in the inner shoulder portion 211. The outer housing 210 includes an outer protruding portion 214 extending relative to a first side 215 of the inner shoulder portion 211. The outer housing 210 includes a sleeve portion 216 extending relative to a second side 217 of the inner shoulder portion 211. The sleeve portion 216 includes a first inner surface 218 at least partially defining a first internal volume 219. The outer housing 210 includes one or more second fluid openings 220 (two are shown) formed in the sleeve portion 216.

The actuator assembly 200 includes an inner housing 221 disposed at least partially in the outer housing 210. The inner housing 221 includes a second inner surface 222 at least partially defining a second internal volume 223. One or more first pistons 230 (one is shown in FIG. 3) are disposed in the first internal volume 219 and movable along the first inner surface 218 of the outer housing 210. The first pistons 230 may be upper pistons. One or more second pistons 240 (one is shown in FIG. 3) are disposed in the second internal volume 223 and movable along the second inner surface 222 of the inner housing 221. The second pistons 240 may be lower pistons. The one or more first pistons 230 are disposed between the one or more second pistons 240 and the inner shoulder portion 211 of the outer housing 210.

The present disclosure facilitates scalability of actuator assemblies. As an example, the present disclosure contemplates that more than one first piston 230 and/or more than one second piston 240 can be used. In one embodiment, which can be combined with other embodiments, three or more first pistons 230 are used.

The actuator assembly 200 includes an actuator stem 250 disposed through the outer protruding portion 214 and through the inner shoulder portion 211 of the outer housing 210. The actuator assembly 200 includes a cap ring 260 coupled to the inner housing 221, and a valve stem 270 disposed through the cap ring 260 and coupled to the one or more second pistons 240. The cap ring 260 is coupled to the inner housing 221 through an end ring 274 between the cap ring 260 and the inner housing 221.

The actuator assembly 200 includes a plurality of washers 273 (three are shown) disposed between the one or more first pistons 230 and the one or more second pistons 240. The actuator assembly 200 includes a valve head 271 coupled to the valve stem 270. The valve head 271 is configured to abut against a seat 272 of the valve 101. The valve head 271 abuts against the seat 272 in the closed position.

The actuator assembly 200 includes one or more first hydraulic lines 275 fluidly connected to the one or more second fluid openings 220, and one or more second hydraulic lines 276 fluidly connected to the one or more first fluid openings 212, 213. The one or more first hydraulic lines 275 and the one or more second hydraulic lines 276 are fluidly connected to one or more fluid sources 291, 292 that supply, respectively, a first pressurized fluid H1 to the second internal volume 223 and a second pressurized fluid H2 to the first internal volume 219. The one or more fluid sources 291, 292 and/or one or more vacuum sources can be used to release (e.g., exhaust) the first pressurized fluid H1 and the second pressurized fluid H2 from the first and second internal volumes 219, 223. In one embodiment, which can be combined with other embodiments, each of the first pressurized fluid H1 and the second pressurized fluid H2 is a hydraulic fluid.

The first pressurized fluid H1 applies a pressure to the one or more second pistons 240 to facilitate maintaining the one or more second pistons 240 in the closed position. The present disclosure contemplates that the first pressurized fluid H1 can apply pressure to the plurality of washers 273 and to the one or more second pistons 240 through the plurality of washers 273. The second pressurized fluid H2 applies a pressure to the one or more first pistons 230 to facilitate maintaining the one or more first pistons 230 in a first position. The present disclosure contemplates that one or more washers can be positioned between the one or more first pistons 230 and the inner shoulder portion 211, and the second pressurized fluid H2 can apply pressure to the one or more washers and to the one or more first pistons 230 through the one or more washers.

Figure 4:
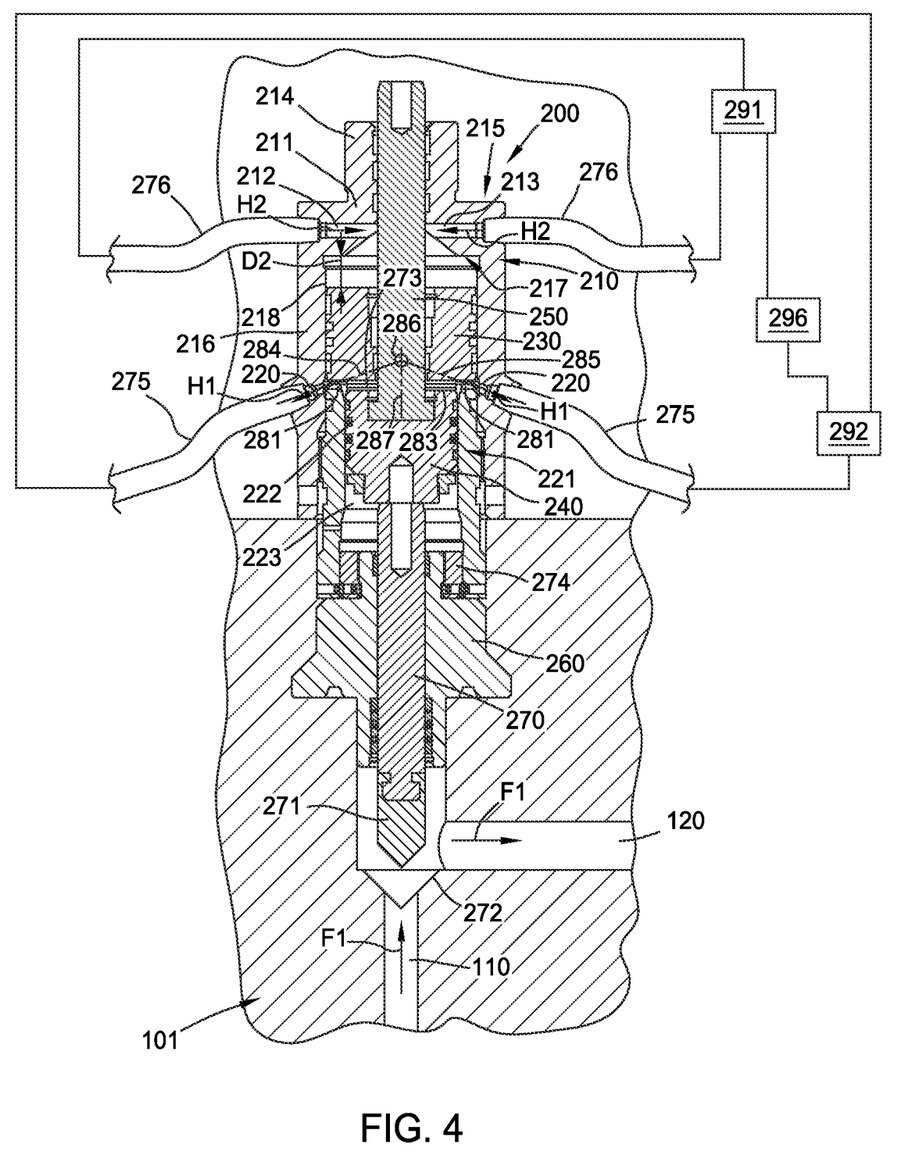
FIG. 4 is schematic partial cross-sectional view, along Section 3-3 shown in FIG. 2, of the valve system in a first open positon, according to one implementation.

FIG. 4 is schematic partial cross-sectional view, along Section 3-3 shown in FIG. 2, of the valve system 100 shown in FIG. 1, according to one implementation. The actuator assembly 200 is in a first open position in FIG. 4.

In the first open position, the fluid F1 flows from the inlet passage 110 and to the outlet passage 120. The first open position corresponds to a first flow rate for the fluid F1 flowing to the outlet passage 120. The second internal volume 223 is a first chamber volume and the first internal volume 219 is a second chamber volume. The present disclosure contemplates that a wide variety of solid(s) and/or fluid(s) can be used for the fluid F1, such as sand, water, oil, and/or gas.

The first pressurized fluid H1 is released from the second internal volume 223 through the one or more second fluid openings 220 to move the valve stem 270, the one or more second pistons 240, and the actuator stem 250. The valve stem 270 and the one or more second pistons 240 move to the first open position. The actuator stem 250 moves to a first actuator position relative to the outer housing 210. In the first open position, the one or more second pistons 240 stop against the one or more first pistons 230 (as shown in FIG. 4). The one or more second pistons 240 can stop by abutting against the one or more first pistons 230, or the one or more second pistons 240 can stop against the one or more first pistons 230 through the plurality of washers 273 abutting against the one or more first pistons 230.

In the first open position, the second pressurized fluid H2 remains in the first internal volume 219 (the second chamber volume) to maintain the one or more first pistons 230 in the first position.

Figure 5:
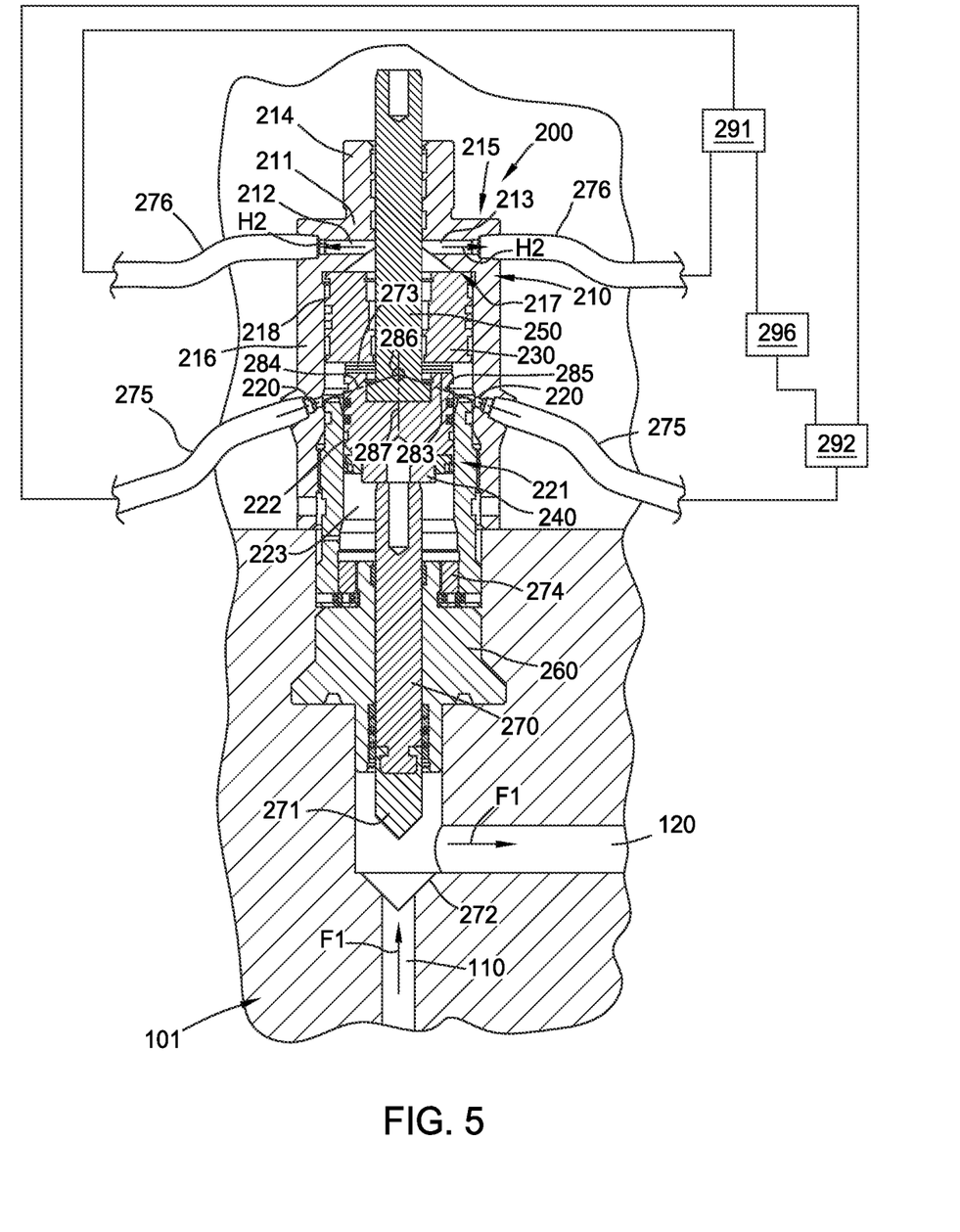
FIG. 5 is schematic partial cross-sectional view, along Section 3-3 shown in FIG. 2, of the valve system in a second open position, according to one implementation.

FIG. 5 is schematic partial cross-sectional view, along Section 3-3 shown in FIG. 2, of the valve system 100 shown in FIG. 1, according to one implementation. The actuator assembly 200 is in a second open position in FIG. 5.

In the second open position, the fluid F1 flows from the inlet passage 110 and to the outlet passage 120. The second open position corresponds to a second flow rate for the fluid F1 flowing to the outlet passage 120. The second flow rate is larger than the first flow rate.

The second pressurized fluid H2 is released from the first internal volume 219 through the one or more first fluid openings 212, 213 to move the valve stem 270, the one or more first pistons 230, the one or more second pistons 240, and the actuator stem 250. The valve stem 270, the one or more first pistons 230, and the one or more second pistons 240 move to the second open position. The actuator stem 250 moves to a second actuator position relative to the outer housing 210. In the second open position, the one or more first pistons 230 stop against the inner shoulder portion 211 of the outer housing 210 (as shown in FIG. 5).

The one or more first pistons 230 can stop by abutting against the inner shoulder portion 211 of the outer housing 210, or the one or more first pistons 230 can stop against the inner shoulder portion 211 of the outer housing 210 through one or more washers abutting against the inner shoulder portion 211 of the outer housing 210. The valve stem 270 and the actuator stem 250 are coupled to the one or more second pistons 240 to move with the one or more second pistons 240. In one embodiment, which can be combined with other embodiments, the one or more first pistons 230 act as an opening limit for the one or more second pistons 240, the valve stem 270, and the valve head 271. The movement of the one or more first pistons 230 to the second open position facilitates allowing the one or more second pistons 240 to move to the second open position. In the second closed position, the one or more first pistons 230 are in a second position that is farther from the seat 272 than in the first position.

The movement of the actuator assembly 200 from the closed position toward the first open position and the second open position are part of an opening actuation operation that opens the valve system 100.

In a closing actuation operation that closes the valve system 100, the one or more fluid sources 291, 292 supply the second pressurized fluid H2 to the first internal volume 219 (the second internal chamber volume) through the one or more first fluid openings 212, 213 to move the one or more first pistons 230 and the one or more second pistons 240 from the second open position to the first open position (shown in FIG. 4). The closing actuation operation includes the one or more fluid sources 291, 292 supplying the first pressurized fluid H1 to the second internal volume 223 (the first internal chamber volume) through the one or more second fluid openings 220 to move the one or more second pistons 240 from the first open position to the closed position (shown in FIG. 3). The first pressurized fluid H1 is supplied to a gap 281 (shown in FIG. 4) between the inner housing 221 and the one or more first pistons 230.

In the second open position (shown in FIG. 5), an end 283 of the one or more second pistons 240 facing the one or more first pistons 230 is aligned outwardly of an intersection point 286. The intersection point 286 is a point where central axes 284, 285 of the one or more second fluid openings 220 intersect with a central axis 287 of the sleeve portion 216.

In the first open position (shown in FIG. 4), the end 283 of the one or more second pistons 240 facing the one or more first pistons 230 is aligned inwardly of the intersection point 286. The end 283 aligned inwardly of the intersection point 286 facilitates the first pressurized fluid H1 moving the one or more second pistons 240 to the closed position.

Upon the removal of the first pressurized fluid H1 from the second internal volume 223 and the second pressurized fluid H2 from the first internal volume 219, the fluid F1 can apply pressure to the valve head 271 to move the one or more second pistons 240 and the one or more first pistons 230.

A first stroke distance D1 (shown in FIG. 3) is between the one or more first pistons 230 and the one or more second pistons 240 (or the plurality of washers 273, if used) in the closed position. The one or more second pistons 240 travel the first stroke distance D1 to move from the closed position and to the first open position. In one embodiment, which can be combined with other embodiments, the first stroke distance D1 is within a range of 2.5 inches to 3.5 inches. In one example, which can be combined with other examples, the first stroke distance D1 is 3.0 inches.

A second stroke distance D2 (shown in FIGS. 3 and 4) is between the one or more first pistons 230 (or one or more washers between the one or more first pistons 230 and the inner shoulder portion 211, if used) and the inner shoulder portion 211 (or the plurality of washers 273, if used) in the closed position and the first open position. The one or more first pistons 230 and the one or more second pistons 240 travel the second stroke distance D2 to move from the first open position and to the second open position. In one embodiment, which can be combined with other embodiments, the second stroke distance D2 is within a range of 3.5 inches to 4.5 inches. In one example, which can be combined with other examples, the second stroke distance D2 is 4.0 inches.

Figure 6:
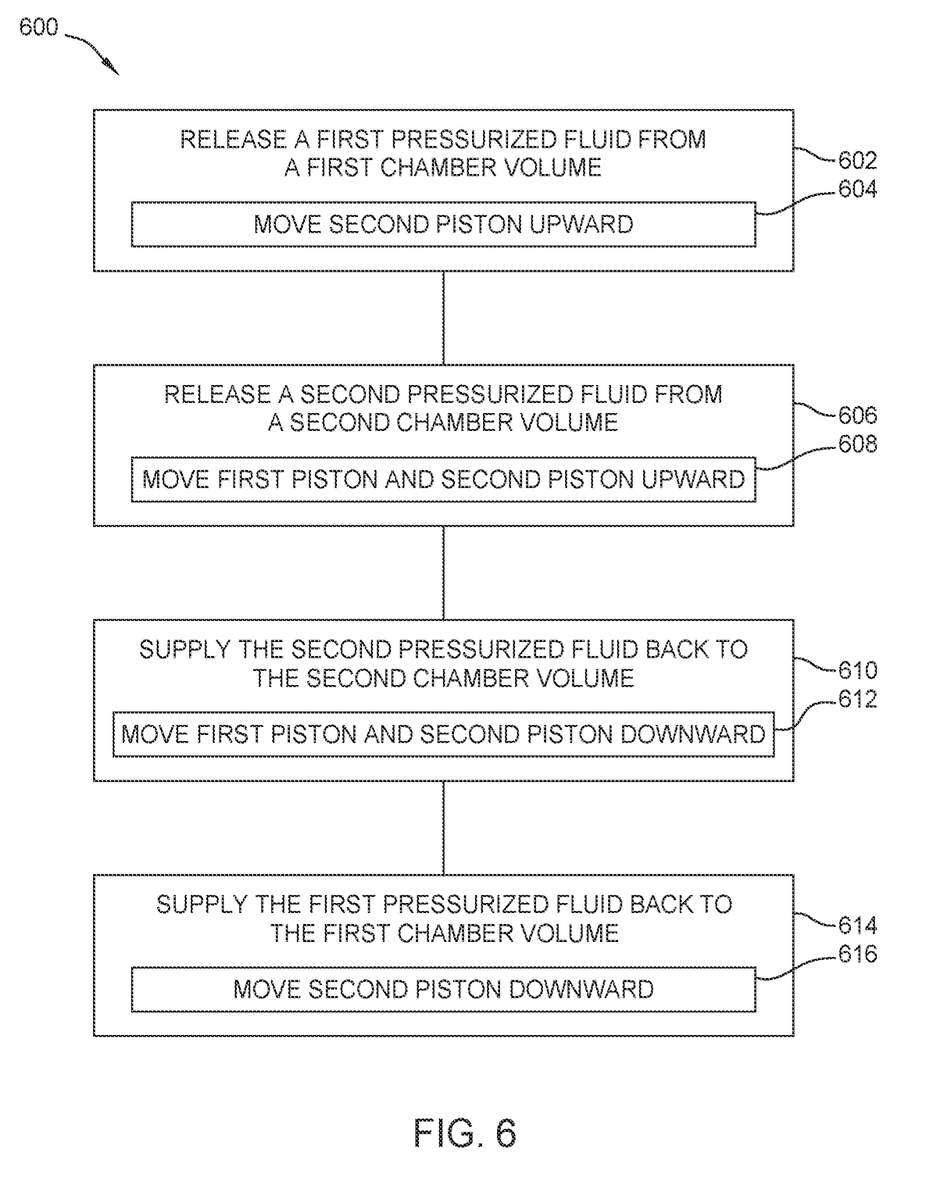
FIG. 6 is a schematic block diagram view of a method of actuating a valve, according to one implementation.

A controller 296 is in communication with the one or more fluid sources 291, 292 to control actuation of the actuation assembly 200 to open and close the valve system 100. The controller 296 controls the supply and release of the first pressurized fluid H1 and the second pressurized fluid H2. The controller 296 can include instructions (such as software) stored on a memory that, when executed by a processor, control the operations of the actuation assembly 200. The instructions of the controller 296 can use simple automation modules for internet explorer (SAMI) automation software. In one embodiment, which can be combined with other embodiments, the instructions of the controller 296 (when executed by the processor) cause the operations 602, 604, 606, 608, 610, 612, 614, 616 of the method 600 to be conducted.

The instructions of the controller 296 can use simple automation module for internet explorer (SAMI) automation software that controls the operation of the valve system 100 using one or more operational parameters. In one embodiment, which can be combined with other embodiments, the one or more operational parameters include a measured flow rate, a measured pressure, and/or other measured parameters of fluid flowing through the valve 101. The controller 296 controls flow rates for the valve 101 in an automated manner, reducing the amount of manual operation needed from operations personnel.

FIG. 6 is a schematic block diagram view of a method 600 of actuating a valve, according to one implementation. To open the valve, operation 602 includes releasing a first pressurized fluid from a first chamber volume between a first piston disposed in an outer housing and a second piston disposed in an inner housing that is disposed at least partially in the outer housing. At operation 604, the releasing of the first pressurized fluid includes moving the second piston (such as in an upward direction away from the valve) until the second piston stops against the first piston. The second piston is moved by pressurized fluid flowing through the valve, which pushes on a valve stem to move the second piston.

In one embodiment, which can be combined with other embodiments, the stopping of the second piston against the first piston includes the second piston abutting against a plurality of washers that abut against the first piston. The moving of the second piston includes moving a valve stem coupled to the second piston to a first open position. The moving of the valve stem to the first open position includes extending the valve stem through an inner shoulder portion and an outer protruding portion of the outer housing and outwardly relative to a first side of the inner shoulder portion.

The first open position corresponds to a first flow rate. The first open position may be a half stroke of the valve. The moving of the second piston includes moving an actuator stem to a first actuation position relative to the outer housing. The actuator stem is coupled to the second piston. The moving of the second piston to stop the second piston against the first piston includes moving the second piston along an inner surface of the inner housing.

Operation 606 includes releasing a second pressurized fluid from a second chamber volume between the first piston and the outer housing. At operation 608, the releasing of the second pressurized fluid includes moving the first piston and the second piston (such as in an upward direction away from the valve) until the first piston stops against the outer housing. The moving of the first piston and the second piston includes moving the valve stem coupled to the second piston to a second open position, which is moved by pressurized fluid flowing through the valve and pushes on the valve stem.

The second open position corresponds to a second flow rate that is larger than the first flow rate. The second open position may be a full stroke of the valve. The moving of the first piston and the second piston includes moving the actuator stem to a second actuation position relative to the outer housing.

The moving of the first piston and the second piston until the first piston stops against the outer housing includes moving the first piston along an inner surface of the outer housing to abut the first piston against the inner shoulder portion of the outer housing. The moving of the valve stem to the second open position includes extending the valve stem through the inner shoulder portion and the outer protruding portion of the outer housing and outwardly relative to the first side of the inner shoulder portion.

To close the valve, operation 610 includes supplying the second pressurized fluid back to the second chamber volume. At operation 612, the supplying of the second pressurized fluid includes moving the first piston, the second piston, and the valve stem (such as in a downward direction toward the valve) from the second open position to the first open position. The moving of the valve stem to the first open position includes extending the valve stem through the inner shoulder portion and the outer protruding portion of the outer housing and inwardly relative to a second side of the inner shoulder portion. The moving of the second piston includes moving the actuator stem to the first actuation position relative to the outer housing.

Operation 614 includes supplying the first pressurized fluid to the first chamber volume. At operation 616, the supplying of the first pressurized fluid includes moving the second piston and the valve stem (such as in a downward direction toward the valve) from the first open position to the closed position. The moving of the valve stem to the closed position includes extending the valve stem through the inner shoulder portion and the outer protruding portion of the outer housing and inwardly relative to the second side of the inner shoulder portion.

Figure 7:
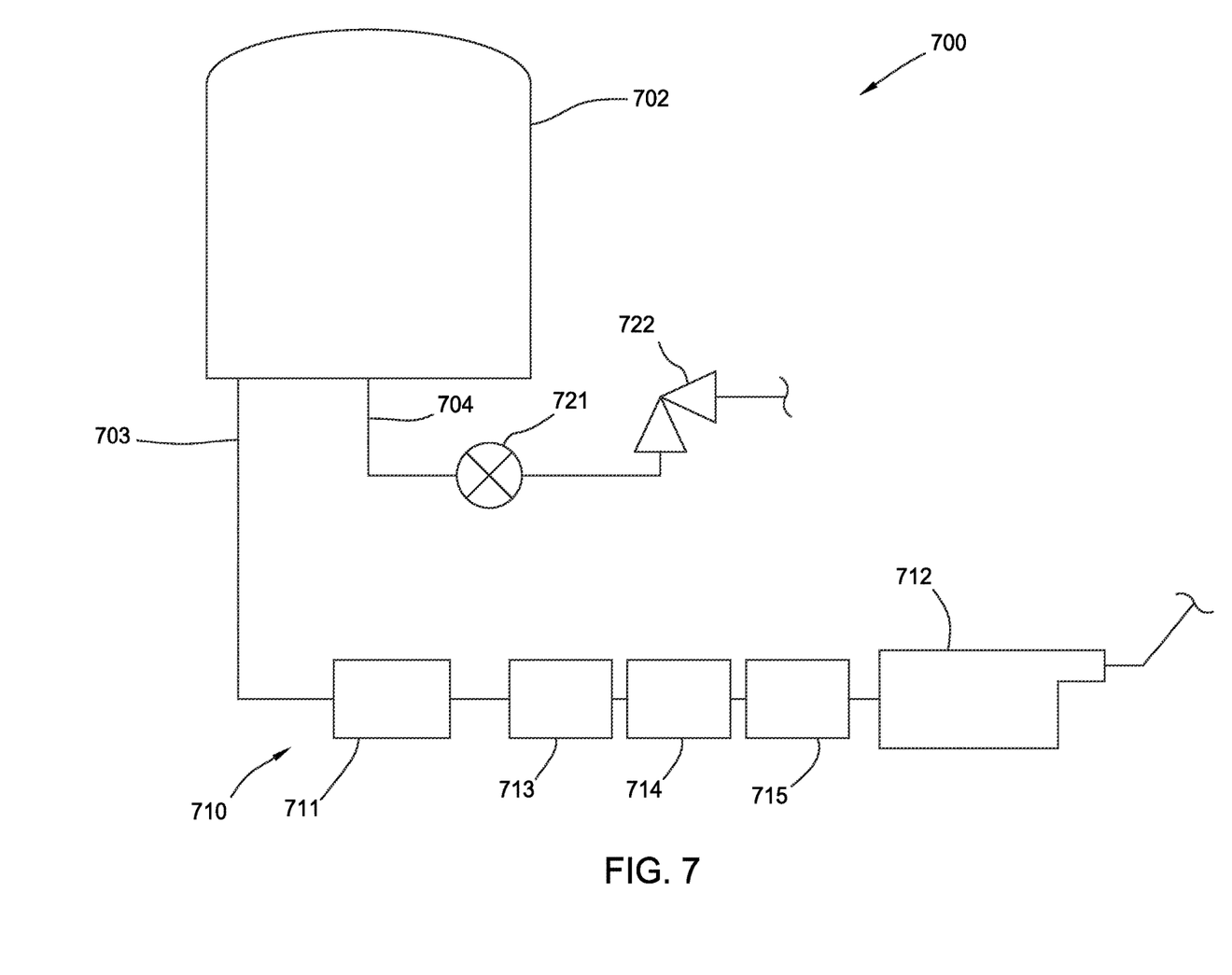
FIG. 7 is a schematic plan view of another valve system, according to one implementation.

FIG. 7 is a schematic plan view of a valve system 710 coupled to a solid separator 702, according to one implementation. The valve system 710 and the solid separator 702 are part of a separation system 700. The valve system 710 is disposed along a first outlet line 703 coupled to the solid separator 702. A second outlet line 704 is coupled to the solid separator 702.

The solid separator 702 is configured to separate solids (such as sand) from fluids (such as oil or gas). The separated solids exit the solid separator 702 through the second outlet line 704. The separated fluids exit the solid separator 702 through the first outlet line 703. The second outlet line 704 includes one or more valves 721, 722 (two are shown). A first valve 721 is a ball valve. The first valve 721 can be a relief valve or an excess flow valve. A second valve 722 is an angle valve.

The first outlet line 703 includes one or more valves 711, 712 (two are shown). A first valve 711 can be an indicator valve that indicates flow. A second valve 712 can be a choke valve. The first outlet line 710 also includes a first fail open valve 713, a second fail open valve 714, and a fail close valve 715.

The actuator assembly 200 shown in FIGS. 1-5 can be used to actuate one or more of the valves of the separation system 700, such as the second valve 712 (the choke valve).

Benefits of the present disclosure include modularity in actuating valves (for example, metering valves), variances in flow rates, scalability of designs (such as length and/or number of pistons) of actuator assemblies, and variances in compositions (such as sand and/or gas) of flow through valves. Benefits also include reduced expenditure of resources, reduced costs, enhanced efficiencies, automated flow control, and reduced expenditure of personnel for manual operations.

It is contemplated that one or more of the aspects disclosed herein may be combined. Moreover, it is contemplated that one or more of these aspects may include some or all of the aforementioned benefits. As an example, the present disclosure contemplates that one or more aspects, features, operations components, and/or properties of the valve system 100, the actuator assembly 200, the method 600, and/or the separation system 700 may be combined. For example, one or more of the operations described for the valve system 100 and the actuator assembly 200 can be combined with one or more of the operations 602, 604, 606, 608, 610, 612, 614, 616 described for the method 600.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The disclosure also contemplates that one or more aspects of the embodiments described herein may be substituted in for one or more of the other aspects described. The scope of the disclosure is determined by the claims that follow.

We claim:

1. An actuator assembly for valves, comprising:
   an outer housing comprising:
      a first inner surface at least partially defining a first internal volume, and
      an inner shoulder portion;
   an inner housing disposed at least partially in the outer housing, the inner housing comprising a second inner surface at least partially defining a second internal volume;
   one or more first pistons disposed in the first internal volume and movable along the first inner surface of the outer housing;
   one or more second pistons disposed in the second internal volume and movable along the second inner surface of the inner housing, the one or more first pistons disposed between the one or more second pistons and the inner shoulder portion of the outer housing; and
   an actuator stem disposed through at least a portion of the outer housing and coupled to the one or more second pistons.

2. The actuator assembly of claim 1, further comprising a plurality of washers disposed between the one or more first pistons and the one or more second pistons.

3. The actuator assembly of claim 1, wherein the outer housing further comprises:
   an outer protruding portion extending relative to a first side of the inner shoulder portion; and
   a sleeve portion extending relative to a second side of the inner shoulder portion, the sleeve portion having the first inner surface.

4. The actuator assembly of claim 3, further comprising one or more first fluid openings formed in the inner shoulder portion, one or more second fluid openings formed in the sleeve portion, a cap ring coupled to the inner housing, and a valve stem disposed through the cap ring and coupled to the one or more second pistons.

5. The actuator assembly of claim 3, wherein the actuator stem is disposed through the outer protruding portion and through the inner shoulder portion.

6. The actuator assembly of claim 3, wherein the outer housing further comprises:
   one or more first fluid openings formed in the inner shoulder portion; and
   one or more second fluid openings formed in the sleeve portion.

7. The actuator assembly of claim 6, further comprising:
   one or more first hydraulic lines fluidly connected to the one or more first fluid openings; and
   one or more second hydraulic lines fluidly connected to the one or more second fluid openings.

8. The actuator assembly of claim 1, further comprising a valve stem coupled to the one or more second pistons.

9. The actuator assembly of claim 8, further comprising a valve head coupled to the valve stem, wherein the valve head is configured to abut against a seat of a valve.

10. The actuator assembly of claim 8, further comprising a cap ring coupled to the inner housing, wherein the valve stem is disposed through the cap ring.

11. A method of actuating a valve, comprising:
    releasing a first pressurized fluid from a first chamber volume between a first piston disposed in an outer housing and a second piston disposed in an inner housing that is disposed at least partially in the outer housing, the releasing of the first pressurized fluid comprising:
       moving the second piston to stop the second piston against the first piston, the moving of the second piston comprising moving a valve stem coupled to the second piston to a first open position, the first open position corresponding to a first flow rate; and
    releasing a second pressurized fluid from a second chamber volume between the first piston and the outer housing, the releasing of the second pressurized fluid comprising:
       moving the first piston and the second piston to stop the first piston against the outer housing, the moving of the first piston and the second piston comprising moving the valve stem coupled to the second piston to a second open position, the second open position corresponding to a second flow rate that is larger than the first flow rate.

12. The method of claim 11, wherein the stopping of the second piston against the first piston comprises the second piston abutting against a plurality of washers that abut against the first piston.

13. The method of claim 11, wherein the moving of the second piston further comprises moving an actuator stem to a first actuation position relative to the outer housing, wherein the actuator stem is coupled to the second piston.

14. The method of claim 13, wherein the moving of the first piston and the second piston further comprises moving the actuator stem to a second actuation position relative to the outer housing.

15. The method of claim 11, wherein the outer housing comprises:
    an inner shoulder portion;
    an outer protruding portion extending relative to a first side of the inner shoulder portion; and
    a sleeve portion extending relative to a second side of the inner shoulder portion, the sleeve portion comprising a first inner surface at least partially defining a first internal volume.

16. The method of claim 15, wherein the inner housing comprises a second inner surface at least partially defining a second internal volume.

17. The method of claim 16, wherein the moving of the second piston to stop the second piston against the first piston comprises moving the second piston along the second inner surface of the inner housing.

18. The method of claim 17, wherein the moving of the valve stem to the first open position comprises extending the valve stem through the inner shoulder portion and the outer protruding portion of the outer housing and outwardly relative to the first side of the inner shoulder portion.

19. The method of claim 17, wherein the moving of the first piston and the second piston to stop the first piston against the outer housing comprises moving the first piston along the first inner surface of the outer housing to abut the first piston against the inner shoulder portion of the outer housing.

20. The method of claim 19, wherein the moving of the valve stem to the second open position comprises extending the valve stem through the inner shoulder portion and the outer protruding portion of the outer housing and outwardly relative to the first side of the inner shoulder portion.

\* \* \* \* \*